June 1, 1948. J. C. AUTEN 2,442,634
TRANSMISSION CONTROL MECHANISM
Original Filed April 4, 1945 2 Sheets-Sheet 1
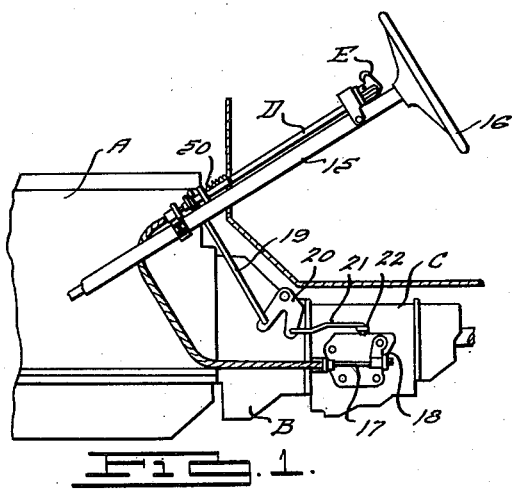
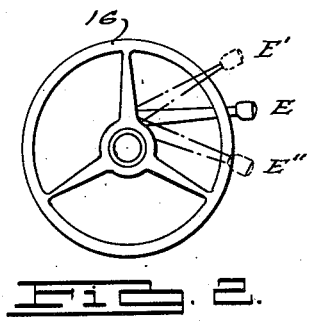
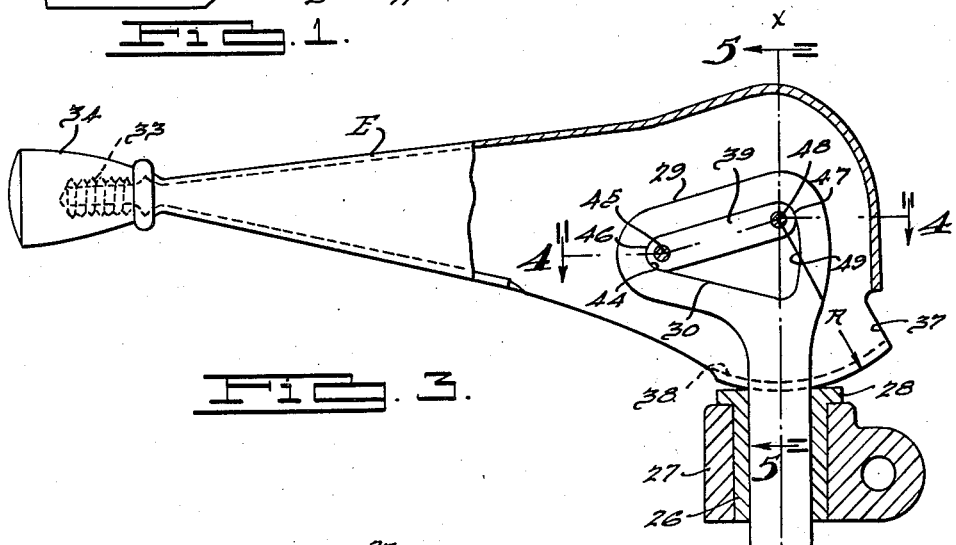
INVENTOR.
Jay C. Auten.
BY
Harness and Harris
ATTORNEYS.

INVENTOR.
Jay C. Auten.
BY
Harness and Harris
ATTORNEYS.

Patented June 1, 1948

2,442,634

UNITED STATES PATENT OFFICE 2,442,634

TRANSMISSION CONTROL MECHANISM

Jay C. Auten, Royal Oak, Mich., assignor to Chrysler Corporation, Highland Park, Mich., a corporation of Delaware Original application April 4, 1945, Serial No. 586,498. Divided and this application February 21, 1946, Serial No. 649,194

3 Claims. (Cl. 74—484)

This invention relates to transmission control mechanism and refers more particularly to improvements in transmission remote shift mechanism especially adapted for mounting on motor vehicle steering posts.

This application is a division of my copending application Serial No. 586,498, filed April 4, 1945.

It is an object of my invention to provide a control mechanism capable of being manufactured at lower cost than devices of this general type heretofore known.

Another object is to provide a control which is less likely to rattle than known devices and which will give better service and have longer life.

A further object is to provide an improved arrangement for biasing the hand lever in a direction serving to offset the effect of gravity acting on the hand lever and tending to unintentionally shift the hand lever out of certain of its positions of shift, such tendency being aggravated by the vibration or jiggle of the vehicle as it is being driven along a rough roadway. I have also arranged my improved biasing means to yieldingly urge the control mechanism toward one of the paths of H-shift such as what is commonly termed the high speed side as distinct from the side for selecting reverse. An important characteristic of my biasing means resides in an arrangement which will avoid spring failures experienced in the past due, for example, to tendency of the spring to wrap around the main operating shaft.

Another object is to provide a biasing means for the main control rod so arranged as to yieldingly maintain the shift lever against accidental and undesired displacement from each of its positions of shift forwardly and rearwardly from the neutral gate. My arrangement, according to one embodiment of my invention, is such that the biasing means does not operate to yieldingly urge shift of the lever toward neutral from a position of shift either forwardly or rearwardly from neutral in the general H-path of lever shift.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto;

Fig. 2 is a plan view of the steering wheel and driver operable shift lever as viewed by the vehicle driver;

Fig. 3 is a sectional elevational view through the shift lever and connection to the steering post mounted control rod;

Fig. 4 is a detail sectional plan view taken as indicated by line 4—4 of Fig. 3;

Figure 5:
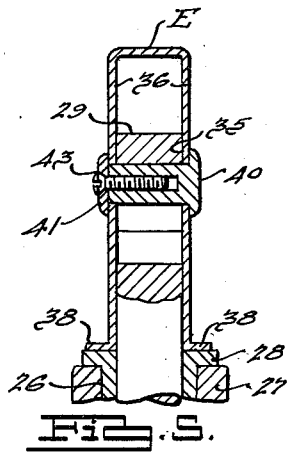
Fig. 5 is a sectional elevational view taken as indicated by line 5—5 of Fig. 3.

In the drawings I have illustrated my invention in connection with a motor vehicle comprising the well known engine A, clutch B, and any type of transmission C which is adapted to be manipulated at least in part by the vehicle driver. In general, my invention provides improvements in the transmission control mechanism illustrated in the patents to F. W. Slack No. 2,291,111 of July 28, 1942, and O. E. Fishburn No. 2,284,191 of May 28, 1942, and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connection, such as through the link and lever system 19, 20, 21, to the transmission lever 22 thereby to operate the transmission speed ratio control element which has been selected by rotary movement of rod D.

Rod D may be suitably guided adjacent its lower end to accommodate its rotary and longitudinal movements as in the yielding bushing 23 (Fig. 6) carried by bracket 24 rigidly mounted on post 15. Rod D may be assembled downwardly in its bushing mountings, a lever 25 being thereafter fixed to the rod for operating link 19. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 to receive a lever operating and guide means. A shift lever E comprises a hollow steel stamping terminating outwardly in a stem portion 33 threaded to receive the handle or knob 34 adapted to be grasped by the driver in manipulating lever E. If desired, the outer end of shift lever E may be formed as an integral part of the lever instead of as a separate part connected thereto. At its inner end, the walls of lever E form a housing for the rod head 29, the sides 35 of the latter slidably engaging the inner side faces of the lever side walls 36 of lever E thereby maintaining the lever against lateral displacement relative to rod D. This housing portion of lever E opens downwardly at 37 above bushing 26 and for providing a slidable fulcrum mounting of lever E on bushing 26, lever fulcruming rockers are carried by the lever. These rockers or cams may be formed adjacent the lower boundary of opening 37 in the form of the laterally extending support flanges 38 having shift lever supporting faces adapted to bear on the upper face of the bushing flange 28. The shift lever E and its association with rod D as illustrated in Fig. 3 herein are described and claimed in my copending application Serial No. 586,498.

In Fig. 3 the rocker flanges 38 are deflected laterally outwardly from the depending side walls 36 of lever E and away from each other, such arrangement permitting these side walls to be fashioned smoothly for a freely fitting engagement with the sides 35 of head 29 as aforesaid and at the same time permitting the rod head 29 to be assembled with lever E by inserting head 29 directly into opening 37 between rockers 38. Rockers 38 are spaced from each other at opposite sides of axis X—X of rod D, the rockers extending in the general direction of the shift lever E so as to intersect a plane through axis X—X transversely to lever E.

The fulcrum point for lever E remains, during operation of the lever, substantially in a plane through axis X—X transverse to the lever. It is desirable to maintain the fulcrum point closely adjacent the rod axis X—X to minimize lateral loads on rod D.

I have provided means supported between the depending side walls of lever E and cooperating with the slotted formation of the lever head 29 for effecting lift of the rod D in response to lift of lever handle 34 and also for maintaining lever E positioned against undesired displacement in the direction of its length transversely to the axis X—X, this means cooperating with the flanges 38 and fulcrum bushing 26 to guide up and down shifting movements of lever E. In Fig. 3 this means comprises a plate 39 extending between the side walls of lever E and having a flanged head 40 seating externally on one side wall, a companion flanged head 41 seating on the opposite side wall and being secured to the plate 39 by fasteners 42 and 43.

Plate 39 extends through slot 30 which is generally triangular in shape having its apex of cylindrical contour at 44 centered about an axis 45 to rotatably fit the cylindrical end 46 of plate 39. The other end of the plate is likewise cylindrically formed at 47 about an axis 48 for engagement with the base 49 of the slot 30, this being of arcuate formation centered on axis 45.

In the Fig. 3 position of the parts with the lever E in its lowermost neutral position the upper face of plate 39 engages the upper wall or side of the triangular slot 30 and when the lever is fully swingingly raised then the lower face of plate 39 engages the lower wall or side of slot 30, the plane containing the parallel axes 45 and 48 thus sweeping through an angle approximately bisected by a plane normal to axis X—X and containing axis 48. Thus, by preference, the plate 39 is initially downwardly and outwardly inclined so that in lifting lever E the axis 45 moves substantially vertically in applying its lift to rod D with a minimum of side thrust on the rod D. However, if desired, the plate 39 may have an initial position horizontally or at some other inclination.

The flanges 38 are preferably of arcuate formation on a radius R about the axis 48 and this axis preferably intersects axis X—X or lies closely adjacent thereto in order to cause lever E to swing vertically about the axis of rod D without undue side thrust thereon and in order to maintain a fixed distance R between the lever axis 48 and the fulcrum surface at 28. With such an arrangement the axis 48 neither rises nor falls for vertical shifts of lever E and, therefore, neither gains nor loses effective lift on the rod D. Of course, by curving flanges 38 about an axis either above or below that illustrated at 48, the effective lift of lever E will be either supplemented by increased lift or decreased lift as the case may be. Furthermore, flanges 38 could be of non-uniform curvature for camming lift if desired.

During upward swing of lever E, the lever axis of rotation 48 has an imperceptible displacement laterally of axis X—X as the plate 39 moves perpendicular to axis X—X and the lever is free to so move by slight slip at the fulcrum support 28.

In order to minimize friction between the fixed fulcrum bushing 26 and the lever flanges 38 slidably seated thereon and to provide for an easy noiseless shift of lever E both vertically and horizontally or laterally, I preferably form the bushing, or its lever supporting face, of some metal composition different from that of the lever flanges. Thus in Fig. 3 the bushing 26 is formed by molding and sintering powdered metal or metals of different melting points in a manner now well known in forming porous metal bearings of the self-lubricating type as, by way of example, set forth in patent to C. A. Tea 1,927,619, of September 19, 1933, and to W. G. Calkins et al. 1,927,627 of September 19, 1933. Lubricant may be provided in the form of graphite included in the metal mixture supplemented by or substituted by fluid lubricant absorbed by immersing the bushing in lubricating oil then to be exuded to the fulcrum surface of bushing flange 28.

Following present known arrangements in remote gearshift mechanisms in general use, rod D is preferably biased downwardly at some convenient point or points in the connections of the operating system, usually within the transmission C. This serves to maintain lever E in its Fig. 3 neutral downwardly swung position known as the high speed range ready to be rotated forwardly about axis X—X to the position E' in Fig. 2 for forward transmission drive setting or rearward to E″ for forward drive in high. Lever E is lifted in neutral and then moved forward about axis X—X for reverse, or rearward for forward drive in low, this latter position being omitted in some well-known shift arrangements especially where the manual shifts are supplemented by automatic shift functions in the transmission.

Because of the inclination of post 15 and rod D, and the mass of lever E, the lever when in the forward position E' has a tendency to work back to neutral especially when driving the car over rough roads. In order to offset this tendency and to also bias the lever E downwardly, I have provided a coil spring 50 (Figs. 6 and 7) having its upper end secured at 51 to rod D. The lower end of this spring is secured at 52 to bracket 24 and is displaced rotatably about axis X—X relative to the end at 51 in a direction tending to bias lever E forwardly from its neutral position, the displacement being such that with the lever shifted to the position E' the spring 50 will act to counterbalance and offset the tendency of the lever to jiggle out of the position E'. At the same time spring 50 exerts a constant downward pull on rod D so that lever E is maintained seated on bushing 26 and to maintain an anti-rattle connection between rod D and lever E.

With lever E in its Fig. 3 neutral position, rod D is biased downward causing head 29 to seat on the upper face of plate 39 thereby forcing the lever E to seat at its flanges 36 on the bushing flange 28 stationarily mounted on the post 15. Rotation of lever E either fore or aft will cause the lever rod D to rotate as a unit about axis X—X, head 29 fitting the side walls of lever E. During this movement flanges 38 rotatably slidably bear on the bushing flange 28. The lubricant content of the bushing 26 insures the desired freedom of sliding contact at flanges 38 free from noise and undue wear.

When lever E is lifted from the Fig. 3 neutral position, preparatory for a rotational shift in the raised position, flanges 38 wipe across flange 28 at the bushing contact substantially in a plane transversely to the shift lever through axis X—X or closely adjacent thereto as in Fig. 3 while the plate portion at 46 lifts the head 29. During this lift, the lever E rotates about axis 43 in providing a mechanical advantage for lifting rod D in the ratio of the effective lengths of lever E and plate 39 from axis X—X. After the lever has been lifted then it is swung about axis X—X. The wiping and rotating movements of flange 38 on flange 28 brings into action at different times the various portions of flanges 38 with the various portions of flange 28 so that there is no tendency to wear a groove in the fulcrum surface of flange 28.

Figure 8:
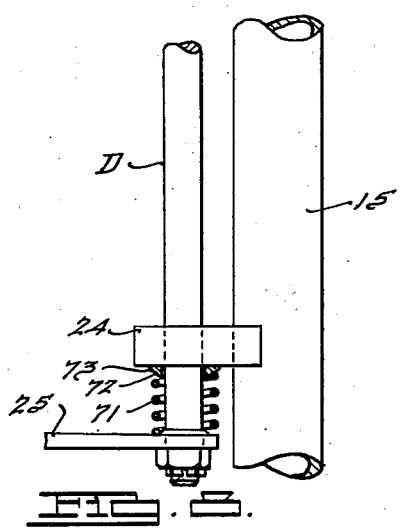
Fig. 8 is a view generally similar to Fig. 6 but illustrating a modified arrangement of biasing means.

Referring to Fig. 8 I have illustrated a modified arrangement of means operating to bias rod D downwardly and also acting to prevent the shift lever from undesirably working back by gravity from its forwardly selected position of adjustment from neutral when vibrations or jiggle effects are experienced in driving the car. Furthermore, the Fig. 8 arrangement has the further advantage of being free from any tendency to bias the shift lever out of its rearwardly selected position of adjustment.

In Fig. 8 I have positioned a coil spring 71 below bracket 24 and having its lower end seated on the lower end of rod D as by engagement with the upper face of lever 25 which is fixed on this rod. Bracket 24 and lever 25 thus act as spring abutments. This spring 71 has a liberal clearance with shaft D such that it will not under any conditions engage the rod and tend to seize thereon and thus lead to spring failure. The upper end of the spring is seated on the shouldered lower face 72 of a washer 73 surrounding rod D with liberal clearance and having its upper flat face rotatably engaging the flat under face of the stationarily mounted bracket 24.

Washer 73 is preferably formed of a body of sintered powdered metal having a lubricant content as described in connection with bushing 26. When the shift lever of any of my illustrated embodiments is shifted forwardly, when equipped with the Fig. 8 arrangement, then rotation of rod D causes spring 71 to torsionally deflect only a slight amount because spring 71 is allowed to bodily rotate. Tendency of the spring 71 to be torsionally stressed being prevented because the spring is free to rotate either at its contact with washer 73 or else by rotating with the washer, the latter slipping at its contact with bracket 24, depending on whether the friction is higher or lower at the bracket surface relative to the contact of the spring contact 72. In either event the friction at the washer surfaces is very small relative to the friction at the lever 25 seating spring 71. The lever will be maintained in its forwardly shifted position owing to the load of spring 71 resisting the gravity pull toward neutral on the main shift lever as well as the jiggle effect on the shift lever, which tends to move the lever rearwardly from its forwardly shifted position.

Figure 6:
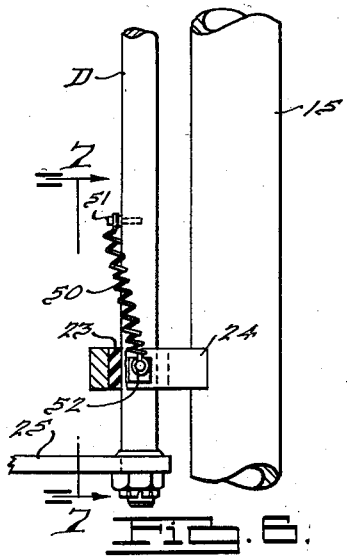
Fig. 6 is an enlarged elevational view illustrating the biasing means for the shift mechanism as viewed in Fig. 1.
Figure 7:
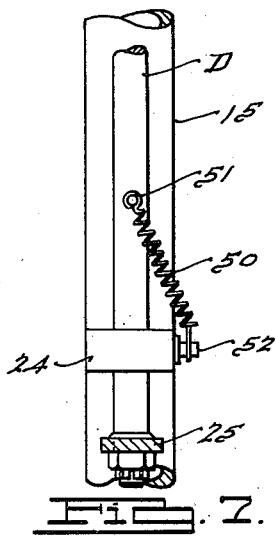
Fig. 7 is a side elevational view of the Fig. 6 structure taken as indicated by line 7—7 of Fig. 6.

The Fig. 8 arrangement has the further advantage over the Fig. 6 arrangement of yieldingly maintaining the shift lever in its position of shift rearwardly from neutral. Although the gravity effect on the lever tends to maintain the shift lever in this position it is desirable in some transmission control systems to eliminate or minimize the Fig. 6 effect of spring 50 acting to bias the shift lever forwardly toward neutral from a position of shift rearwardly from neutral. The Fig. 8 arrangement serves this purpose in the same manner that it yieldingly resists undesired shift of the shift lever from the aforesaid position of shift forwardly from neutral. In other words, the spring 71 in conjunction with washer 72 serves to maintain the shift lever in its positions of shift without introducing a biasing swing of the shift lever about the axis of the selector operator rod D.

In Fig. 8 the spring 71 will remain seated at its lower end on lever 25 without slip at this point because no attempt is made to machine and polish or grind the lever spring seat and the inherent friction at this point is much greater than at washer 73. Furthermore, the torsion tending to be set up in spring 71, when rod D is rotated, is relieved by the slip at washer 73 and this results in a smooth action by reason of the properties of washer 73 and cannot be felt by the operator at the lever handle 34. On the other hand, if the spring 71 was allowed to slip at the lever 25, for example, then the rough action would be objectionable at the handle 34 and furthermore the spring 71 would build up undesired torsion before periodically slipping and would then only partially relieve the torsion leaving an undesired residue biasing the shift lever out of its positions of shift.

I claim:

1. In a control mechanism for selectively operating speed ratio controls of a motor vehicle transmission, a steering column so disposed as to slope downwardly and forwardly of the vehicle from the driver thereof, a main rotatable and reciprocatory control rod mounted on the steering column and extending generally longitudinally of and to one side of the steering column so as to slope with the steering column and adapted for operative connection with the transmission, a shift lever having an outer end portion adapted to be grasped by the vehicle driver and an inner end portion, means operably connecting said inner end portion of said shift lever with the upper end of said rod to effect rotation of said rod substantially about its axis in response to rotary shifting movements of said shift lever and to effect reciprocation of said rod substantially along its axis in response to up and down swinging movements of said shift lever, means providing a fulcrum support for said shift lever so arranged in cooperation with said connecting means as to accommodate driver manipulation of said shift lever rotatably from a neutral position selectively either forwardly or rearwardly substantially about said rod axis and driver manipulation of said shift lever upwardly from said neutral position and then rotatably, a single spring positioned to react against said rod to urge it to its downward position and simultaneously to resist rotation of said rod whereby said spring operates through said rod to bias said shift lever downwardly in opposition to said upward manipulation from said neutral position and also to bias said shift lever in opposition to shift thereof toward said neutral position from its said position of manipulation forwardly from neutral whereby to overcome tendency of the shift lever to undesirably vibrate from said forwardly manipulated position toward its said neutral position under the gravitational force acting on the shift lever during vibratory vehicle travel.

2. In a control mechanism for selectively operating speed ratio controls of a motor vehicle transmission, a steering column so disposed as to slope downwardly and forwardly of the vehicle from the driver thereof, a main rotatable and reciprocatory control rod mounted on the steering column and extending generally longitudinally of and to one side of the steering column so as to slope with the steering column and adapted for operative connection with the transmission, a shift lever having an outer end portion adapted to be grasped by the vehicle driver and an inner end portion, means operably connecting said inner end portion of said shift lever with the upper end of said rod to effect rotation of said rod substantially about its axis in response to rotary shifting movements of said shift lever and to effect reciprocation of said rod substantially along the axis in response to up and down swinging movements of said shift lever, means providing a fulcrum support for said shift lever so arranged in cooperation with said connecting means as to accommodate driver manipulation of said shift lever rotatably from a neutral position selectively either forwardly or rearwardly substantially about said rod axis and driver manipulation of said shift lever upwardly from said neutral position and then rotatably, a tension coil spring disposed to one side of the rod and steering column, means for anchoring the lower end of said spring in fixed position relative to the steering column, and means connecting the upper end of said spring to said rod in such offset relationship with respect to the lower end of the spring that said spring operates through said rod to bias said shift lever downwardly in opposition to said upward manipulation from said neutral position and also to bias said shift lever in opposition to shift thereof toward said neutral position from its said position of manipulation forwardly from neutral whereby to overcome tendency of the shift lever to undesirably vibrate from said forwardly manipulated position toward its said neutral position under the gravitational force acting on the shift lever during vibratory vehicle travel.

3. In a steering column mounted control for a motor vehicle transmission, a driver manipulatable shift lever, a control rod supported by the steering column and adapted to be rotated and reciprocated by said shift lever, and a spring disposed to one side of and having its opposite ends respectively connected to said rod and steering column, the spring connections being so relatively spaced as to bias said rod in the direction of and rotatably about the axis of said rod.

JAY C. AUTEN.

REFERENCES CITED

The following references are of record in the file of this patent:

UNITED STATES PATENTS

| Number | Name | Date |
| --- | --- | --- |
| 2,182,252 | Dolza et al. | Dec. 5, 1939 |
| 2,235,975 | Best | Mar. 25, 1941 |
| 2,237,507 | Shreffler | Apr. 8, 1941 |
| 2,303,787 | Burd | Dec. 1, 1942 |
| 2,324,732 | Slack | July 20, 1943 |